Sept. 15, 1964   W. KOHLHAGEN   3,149,256
SELF-STARTING ROTORS FOR SYNCHRONOUS REACTION MOTORS
Filed Dec. 20, 1960   5 Sheets-Sheet 1

INVENTOR.
Walter Kohlhagen
BY
Attorney.

Sept. 15, 1964    W. KOHLHAGEN    3,149,256
SELF-STARTING ROTORS FOR SYNCHRONOUS REACTION MOTORS
Filed Dec. 20, 1960    5 Sheets-Sheet 2

INVENTOR.
Walter Kohlhagen
BY
Attorney.

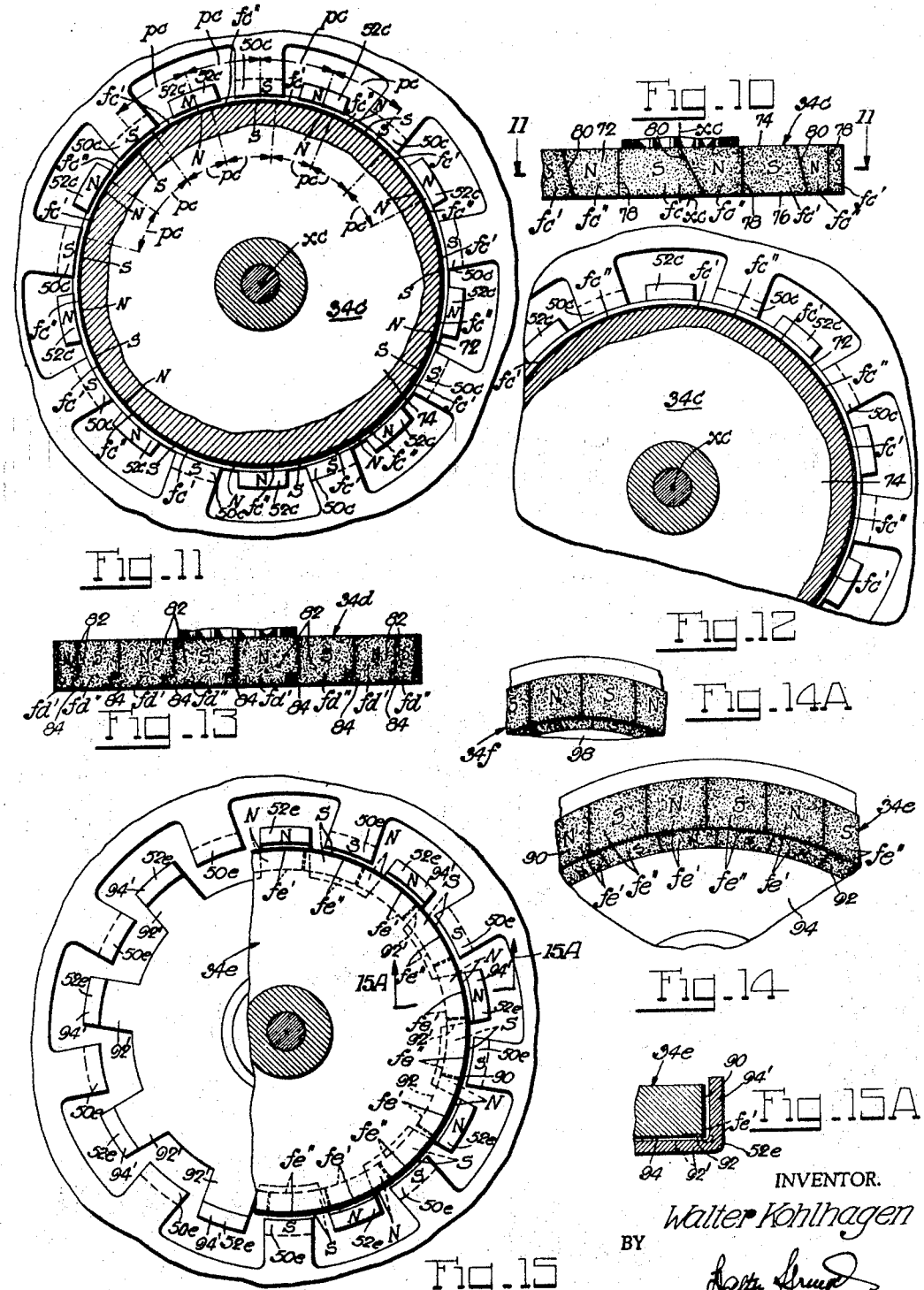

Sept. 15, 1964  W. KOHLHAGEN  3,149,256
SELF-STARTING ROTORS FOR SYNCHRONOUS REACTION MOTORS
Filed Dec. 20, 1960  5 Sheets-Sheet 4
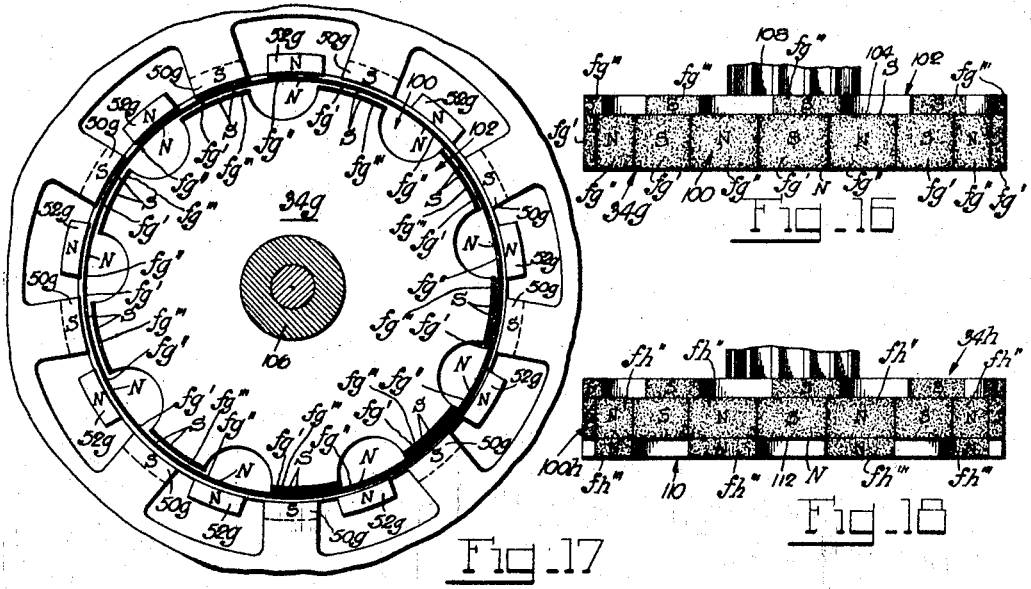
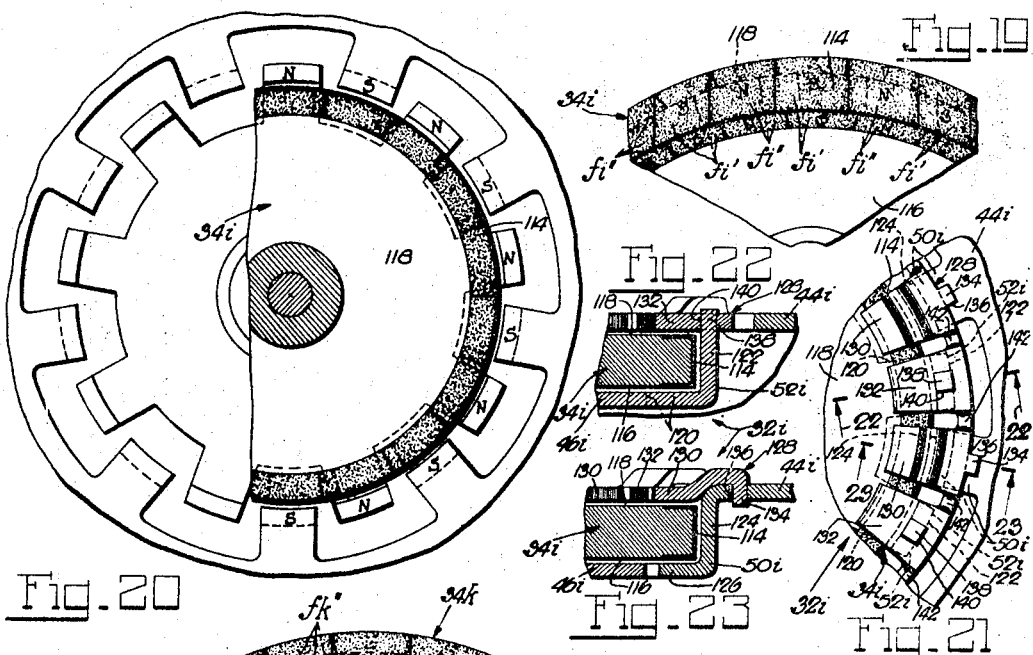
INVENTOR.
Walter Kohlhagen
BY
Attorney

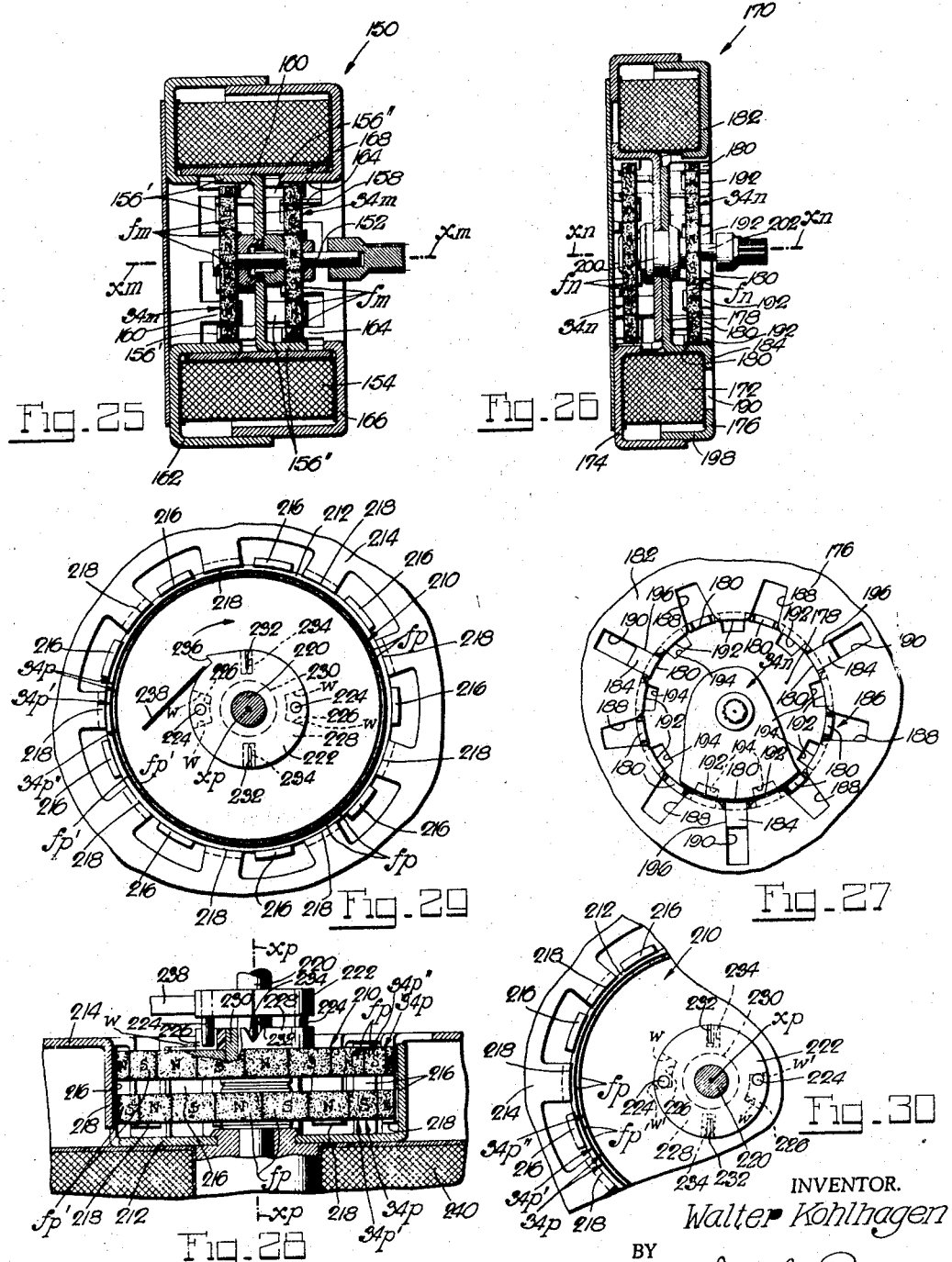

United States Patent Office 3,149,256
Patented Sept. 15, 1964

3,149,256
SELF-STARTING ROTORS FOR SYNCHRONOUS
REACTION MOTORS
Walter Kohlhagen, 818 Oakley Ave., Elgin, Ill.
Filed Dec. 20, 1960, Ser. No. 77,073
34 Claims. (Cl. 310—156)

This invention relates to synchronous reaction motors in general, and to rotors of self-starting type therefor in particular.

The motor to which the present invention pertains is of the well known kind having a multi-polar field of which alternate poles are of opposite sign or polarity at any given instant and change their polarities in phase with an alternating current supplied to an associated field coil, and a permanent-magnet rotor the poles of which cooperate with the field poles in driving the rotor in synchronism with the alternation of the current. To render this kind of motor self-starting, the poles of prior rotors and their associated field poles have been coordinated in various different ways so that the rotors will be subjected to unbalancing magnetic forces for their self-start on excitation of their fields.

It is an object of the present invention to provide a self-starting permanent-magnet rotor of a type having successive pole faces of opposite polarities and a cylindrical periphery provided with magnetized peripheral areas of the pole faces which confront successive field poles, respectively, in any rotor position, with the pole faces being arranged in a pattern of sufficient unbalance with respect to the field pole pattern that the rotor will self-start from any position on excitation of the field.

It is another object of the present invention to provide a self-starting rotor of this type of which the pole faces are substantially continuous with each other peripherally throughout the rotor for optimum pole face area.

It is a further object of the present invention to provide a self-starting rotor of this type of which the pole faces are wholly confined to the rotor periphery for optimum starting and running torque of the rotor in a simple field of axially extending poles.

Another object of the present invention is to provide a self-starting rotor of this type the pole faces of which extend not only on the periphery but also on a peripheral margin of one of the endfaces of the rotor, thereby to enhance the pole face area and also the torque of the rotor in a field which requires to this end mere radial inward extensions on the field poles of one of the two companion sets.

A further object of the present invention is to provide a self-starting rotor of this type for utilization of most, and even nearly all, of the permanent-magnet material for effective pole faces, by forming the rotor in sections of which one section is a permanent-magnet disc axially magnetized to have endfaces of opposite polarities and radially magnetized for pole face formations on its periphery, and the other section is at least one non-permanent magnetic plate on an endface of the disc and having shaped peripheral pole faces adjacent to and augmenting the peripheral pole faces of corresponding polarity on the disc.

It is another object of the present invention to provide a self-starting rotor of this type the pole faces of which extend on the periphery as well as on peripheral margins of both endfaces of the rotor, thereby to attain maximum possible pole face area on and also torque of a single-piece rotor in a field which requires to this end radial inward extensions on the field poles of both companion sets.

Other objects and advantages will appear to those skilled in the art from the following, considered in conjunction with the accompanying drawings.

In the accompanying drawings, in which certain modes of carrying out the present invention are shown for illustrative purposes:

FIG. 10 is a fragmentary side view of another modified rotor;

FIG. 11 is a fragmentary end view of a motor with the rotor thereof being like that, and shown partly in section along the line 11—11 of FIG. 10;

FIG. 12 is a view similar to FIG. 11, with the rotor shown in a different position;

FIG. 13 is a side view of a further modified rotor;

FIGS. 14 and 14A are fragmentary perspective views of still other modified rotors;

FIG. 15 is a fragmentary end view of a motor with the modified rotor of FIG. 14;

FIG. 15A is a fragmentary section taken on the line 15A—15A of FIG. 15;

FIG. 16 is a side view of another modified rotor;

FIG. 17 is a fragmentary end view of a motor with the modified rotor of FIG. 16;

FIG. 18 is a side view of a further modified rotor;

FIG. 19 is a fragmentary perspective view of another modified rotor;

FIG. 20 is a fragmentary end view of a motor with the modified rotor of FIG. 19;

FIG. 21 is a fragmentary end view of a motor with a modified field and the modified rotor of FIG. 19;

FIGS. 22 and 23 are fragmentary sections taken on the lines 22—22 and 23—23, respectively, of FIG. 21;

FIG. 24 is a fragmentary perspective view of a further modified rotor;

FIG. 25 is a section through a motor with another modified rotor arrangement;

FIG. 26 is a section through another motor with a further modified rotor arrangement;

FIG. 27 is a fragmentary top view of the motor of FIG. 27;

FIG. 28 is a fragmentary section through another motor with still another modified rotor arrangement;

FIG. 29 is a fragmentary top view of the motor of FIG. 28; and

FIG. 30 is a fragmentary view similar to FIG. 28, but showing certain operating parts of the motor in different positions.

Figure 1:
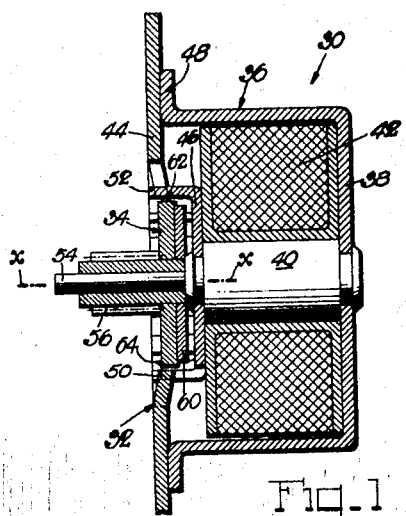
FIG. 1 is a longitudinal section through a motor having a rotor which embodies the present invention.
Figure 2:
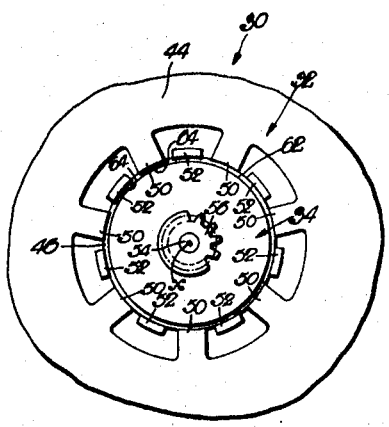
FIG. 2 is a fragmentary end view of the same motor.

Referring to the drawings, and more particularly to FIGS. 1 and 2 thereof, the reference numeral 30 designates a synchronous motor having a field 32 and a rotor 34. The field 32 presently comprises a housing 36 of general cup shape to the bottom 38 of which is secured a center core 40, a field coil 42 in the housing 36 and surrounding the core 40, and outer and inner field plates 44 and 46 which are suitably secured to a top flange 48 of the housing 36 and to the outer end of the center core 40, respectively. The outer and inner field plates 44 and 46 are provided with sets of inner and outer field poles 50 and 52, respectively, which are circularly arranged about a rotor axis $x$ and of which successive poles of one set alternate with successive poles of the other set in conventional manner.

Figure 3:
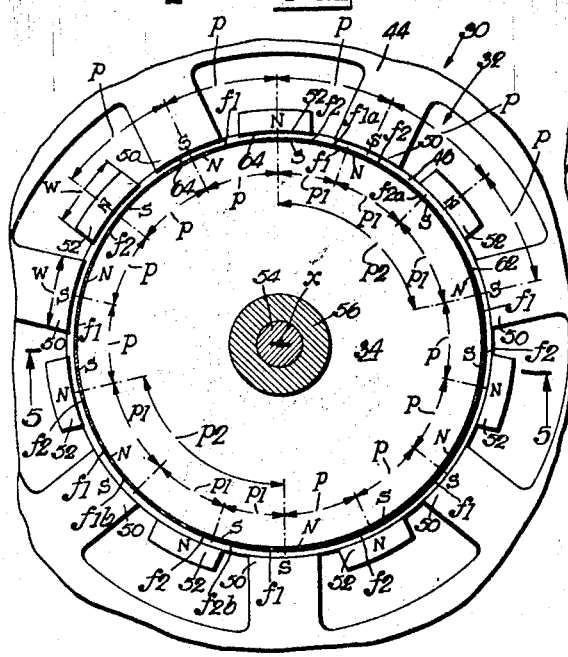
FIG. 3 is an enlarged fragmentary end view of the same motor for clearer illustration of the relation of the rotor and field poles.

Extending from the center core 40 is a rotor shaft 54 on which is journalled a pinion 56 to which is suitably attached, as by a snug fit, the rotor 34 and also a conventional flywheel 60. The pinion 56 may directly drive a load or may be part of a first stage of any desired gear reduction (not shown). The rotor 34 is a permanent magnet provided with series of pole faces $f1$ and $f2$ of opposite polarities, respectively (FIG. 3). The rotor 34 is self-starting as will be fully explained hereinafter.

In operation of the motor, alternating current is supplied to the field coil 42 to produce in the field poles 50 and 52 opposite instantaneous polarities which change in phase with the alternating current, with the rotor pole faces $f1$ and $f2$ cooperating with the field poles in driving the rotor in synchronism with the alternation of the current in a manner which is conventional with motors of this type.

Figure 4:
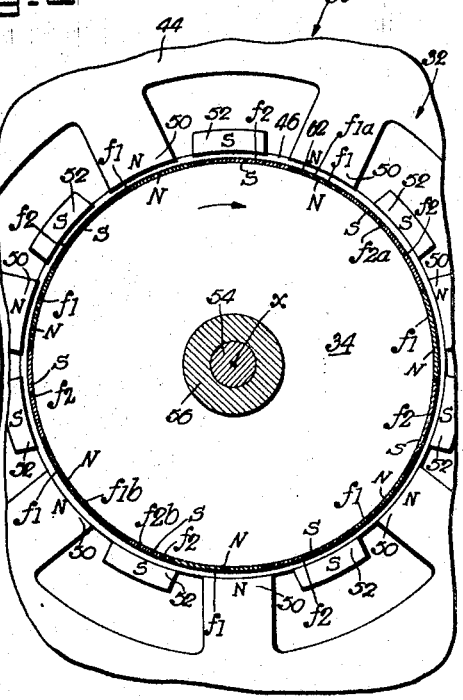
FIG. 4 is a view similar to FIG. 3, showing the rotor in a different position in the field.

Reference is now had to FIGS. 3 and 4 which show the field poles 50, 52 and also the rotor 34 at an enlarged scale. The arrangement of the field poles 50 and 52 may be entirely conventional. As already mentioned, the field poles 50 and 52 of the respective sets are arranged circularly about the rotor axis $x$, with successive poles of either set alternating with successive poles of the other set. Further, the pitch $p$ between successive field poles is preferably the same throughout. Also, all field poles are preferably of the same peripheral widths $w$.

Figure 5:
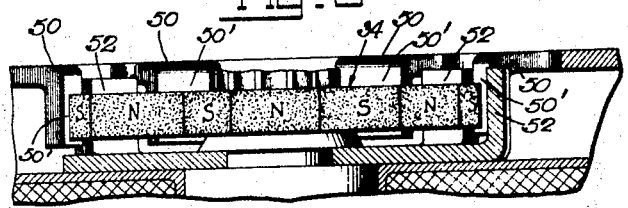
FIG. 5 is a fragmentary section through a motor showing the rotor of FIGS. 3 and 4 in a somewhat modified field.

The permanent-magnet rotor 34 of the present invention has a cylindrical periphery 62 on which the pole faces $f1$ and $f2$ are provided by radial magnetization of the rotor in conventional manner. These peripheral pole faces $f1$ and $f2$ are, for their clearer illustration, indicated in FIGS. 3 and 4 by differently sectioned parts of a peripheral margin of the rotor. Successive pole faces $f1$ and $f2$ of the rotor 34 are so arranged that they confront successive field poles, respectively, in any rotor position. Also, successive pole faces $f1$ and $f2$ are to all practical intents and purposes continuous with each other, though they are in the course of their preferred simultaneous magnetization spaced very slightly as indicated in FIG. 5 by the narrowly spaced parallel lines which designate adjacent ends of successive pole faces. The pole faces $f1$ and $f2$ are presently also equal in number to the field poles and substantially continuous with each other throughout the rotor periphery.

To lend self-starting characteristics to the rotor 34, the pole faces $f1$ and $f2$ are arranged, in accordance with the present invention, in a widthwise irregular or unbalanced pattern so that at least part thereof are differently spaced from the pitchlines of the field poles next to their respective confronting field poles in the rotor positions of optimum alignment of its pole faces with the field pole. To this end, a majority of the pole faces $f1$ and $f2$ are presently of identical widths and spaced at the same pitch $p$ as the field poles, while a minority of the pole faces are of different widths and spaced at different pitch from their adjacent pole faces. The minority of pole faces of different widths and pitch are presently the pole faces $f1a$ and $f2a$ and their presently diametrically opposite counterparts $f2b$ and $f1b$ (FIG. 3), of which the paired pole faces $f1a$, $f2b$ and $f2a$, $f1b$ are of smaller and larger widths, respectively, than the remaining pole faces of uniform widths, with the widths of the pole faces of each of these pairs being identical. The paired pole faces $f1a$, $f2b$ and $f2a$, $f1b$ are presently also continuous with each other, and the width of each of the pole faces $f1a$ and $f2b$ is smaller by the same amount that the width of each of the pole faces $f2a$ and $f1b$ is larger than the presently uniform width of the remaining pole faces, wherefore in any rotor position of optimum pole face alignment with the field poles all pole faces of uniform width align with field poles (FIG. 3). Also, with this arrangement of the pole faces the pitch $p1$ between the pole faces of different widths and their next pole faces is different from the pitch $p$ between the other pole faces, but the overall pitch $p2$ of successive pole faces of different widths is a multiple of the uniform pitch $p$ and presently equal to $3p$.

The present rotor 34 will self-start from any position whatsoever on excitation of the field. To demonstrate this, let it be assumed that the rotor assumes a repose or idle position like that shown in FIG. 3, which is the conceivably worst position for a self-start of the rotor owing to optimum alignment of its pole faces with the field poles and, hence, minimum unbalance of the same with respect to the latter. Nevertheless, the unbalanced pairs of pole faces $f1a$, $f2b$ and $f2a$, $f1b$ will, on excitation of the field, coact with the adjacent field poles in producing a torque in the rotor which will soon start the latter into motion in either direction. Thus, assuming the pole faces polarities of the rotor and the initial polarities of the field poles on excitation of the field to be as indicated in FIG. 3, it stands to reason that with these exemplary initial polarities of the field poles the initial torque produced in the rotor is clockwise as viewed in FIG. 3. This initial torque is hardly ever adequate to overcome the inertia of the rotor and that of any possible load thereon, and the rotor is usually in a state of characteristic unrest or quiver for the next few, more or less, polarity changes of the field poles before a preponderant torque in the rotor in either direction will have adequate starting magnitude to overcome any load on the rotor and cause the latter to take off.

It appears from the preceding description that the rotor 34 will assuredly self-start from a position which is least conducive to a self-start, wherefore it is a foregone conclusion that the rotor will self-start with even greater vigor and starting torque from any other repose position. Also, the starting torque of the rotor is quite high in any take-off position, even if its previous repose position should be the least favorable one in FIG. 3, for example. This is due to the fact that despite the small number of dissimilar pole faces among all pole faces the overall pole face area unbalanced with respect to the field poles is quite considerable, and the pole faces are predominantly within effective reach of field poles of momentarily start-assisting, rather than start-bucking, polarities, in any rotor repose position. This holds true even when the rotor is in a position of optimum alignment of its pole faces with the field poles (FIG. 3), and holds true even more so in any other rotor position, such as that shown in FIG. 4, for example. Thus, with the rotor 34 reposing in the exemplary position of FIG. 4 its dissimilar pole faces $f1a$, $f2a$, $f1b$ and $f2b$ are substantially in alignment with their confronting field poles, but all the remaining pole faces are out of alignment with their respective confronting field poles sufficiently to leave a very considerable overall pole face area unbalanced with respect to the field poles for a considerable initial torque of the rotor on excitation of the field.

The present rotor 34 has also high running torque. This may be seen from FIG. 4 in which the rotor 34 has on its exemplary clockwise drive just passed a running position of minimum reluctance in which the momentary field pole polarities changed to those indicated. Thus, all but the dissimilar pole faces $f1a$, $f2a$, $f1b$ and $f2b$ are at this instant subjected to near optimum clockwise repulsion from and attraction to their nearest field poles of clockwise succession, with the dissimilar pole faces then having no obstructing effect, and on slight further rotation of the rotor even assisting, the orderly clockwise drive of the rotor.

The high running torque of the present exemplary rotor is predicated on the design of the rotor to the end of its optimum subjection at any instant to the unidirectional drive-inducing polarities of the field poles, and to its subjection at any instant to momentarily drive-bucking polarities of the field poles at the barest, and not effectively bucking, minimum necessary for its self-starting characteristics. The design of the rotor to this end is generally achieved by its large number of pole faces, presently being even equal in number to the field poles, the substantial continuity of the pole faces, and the provision among the pole faces of a minority of widthwise dissimilar ones as well as the arrangement of all pole faces so that they confront successive field poles, respectively, in any rotor position.

While in the described motor of FIGS. 1 to 4 the effective areas 64 of the inner field poles 50 are limited by the thickness of the outer field plate 44, and the rotor 34 may, for optimum economy of its permanent-magnet material, be limited in its thickness substantially to that of the outer field plate 44, FIG. 5, shows a modified field in which the rotor 34 may operate with maximum efficiency regardless of its thickness. Thus, the field of FIG. 5 may be like the field of FIG. 1, except that the active parts of the inner field poles 50 extend axially at 50', the same as the outer field poles 52. With this arrangement, the rotor of FIG. 5 may be considerably thicker than the rotor of FIG. 1, and within the same field pole space develop correspondingly greater torque, as will be readily understood.

Figure 6:
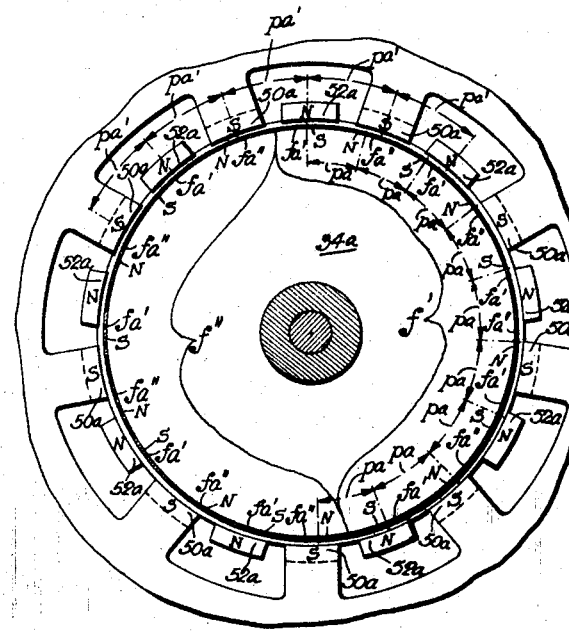
FIG. 6 is a fragmentary end view of a motor with a further modified field and a modified rotor.

The described rotor 34 is of a general type, within the precepts of the present invention, which is rendered self-starting by an overall pitch relation of its pole faces which is different from that of the field poles. Reference is now had to FIG. 6 which shows a different permanent-magnet rotor 34a of the same general type in a field the field poles 50a and 52a of which presently number more than the field poles in FIGS. 1 to 4 and are arranged axially as in FIG. 5. Thus, there are presently eighteen field poles, i.e., nine field poles 50a and nine field poles 52a, and the exemplary rotor 34a has the same overall number of pole faces which are substantially continuous with each other throughout the rotor periphery, with successive poles faces $fa'$ and $fa''$ having opposite polarities. The pole faces $fa'$ and $fa''$ are presently arranged in two identical series $f'$ and $f''$ of which all the pole faces of either series are of different widths. Thus, the successive pole faces of each series in presently clockwise direction (FIG. 6) are of progressively larger peripheral widths and their pitch $pa$ progressively increases correspondingly and being different from the field pole pitch $pa'$. Following the precept of the previously described self-starting rotor 34 of this type for high torque performance, the range within which the widths of the pole faces of both series of the present rotor 34a vary has been so chosen that successive pole faces confront successive field poles, respectively, in any rotor position.

FIG. 6 shows the rotor 34a in one of its repose positions from which it will self-start on excitation of the field. Thus, with the polarities of the rotor pole faces and the exemplary initial polarities of the field poles on excitation of the field being as indicated in FIG. 6, it stands to reason that the initial torque in the rotor is distinctly clockwise, with the rotor taking off in either direction after a few polarity changes of the field poles, as will be readily understood.

The present rotor 34a has reliable and vigorous self-starting performance, owing to the relatively large overall pole face area which is unbalanced with respect to the field poles in any rotor position. Yet, the starting torque of the rotor is quite high and fully adequate to overcome the inertia of the rotor and that of any load thereon, this by virtue of the fact that the overall unbalanced pole face area in any rotor position is distributed over all pole faces and, hence, is for no single pole face or group of pole faces excessive in the sense that the same would be effectively countered in the momentarily induced major torque direction in the rotor by field poles of momentarily bucking polarities.

Figure 7:
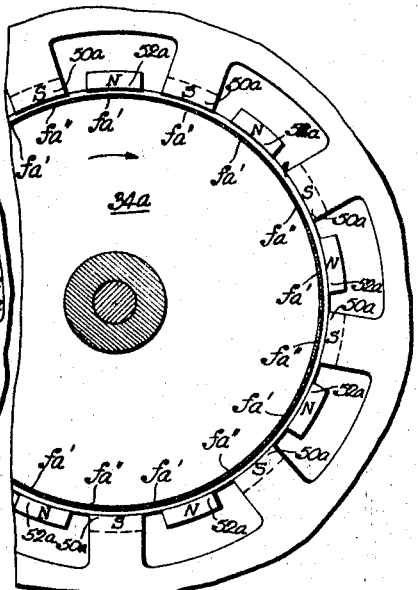
FIG. 7 shows the modified rotor of FIG. 6 in a different position in the field.

The running torque of the rotor 34a is also quite high, as is evidenced from FIG. 7 which shows the rotor in, or nearly in, one of its running positions of minimum reluctance. Thus, with the rotor being driven clockwise in FIG. 7, it will be understood that on the next change of polarity of the field poles from those indicated, which is about to occur on further slight clockwise rotation of the rotor, the pole faces of the rotor will be subjected to overall near maximum clockwise repulsion from and attraction to their nearest field poles, thus meeting the requirements for high running torque.

Figure 8:
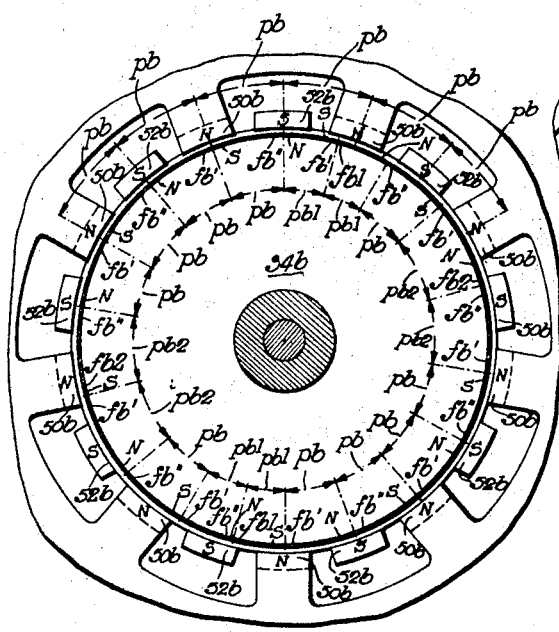
FIG. 8 is a fragmentary end view of a motor with a further modified rotor.

Reference is now had to FIG. 8 which shows another permanent-magnet rotor 34b of the type which relies for its self-start on an overall pitch relation of its pole faces different from that of the field poles. The field in which the present rotor operates may be identical with that of FIG. 6, and the rotor 34b has presently as many pole faces as there are field poles 50b and 52b of the associated sets, with successive pole faces $fb'$ and $fb''$ having opposite polarities and all pole faces being substantially continuous with each other throughout the rotor periphery. The present rotor 34b is similar to the first described rotor 34 of FIG. 3 in the respect that the pole faces of the present rotor are predominantly of uniform peripheral widths and a few, presently two, pairs of pole faces are of dissimilar widths. Thus, all pole faces except the two pairs $fb1$ and $fb2$ have uniform peripheral widths and are spaced from each other at the field pole pitch $pb$, presently 20°. The pole faces of each of these two dissimilar pairs are diametrically opposite each other and of identical widths, with the width of each pole face $fb1$ of one pair being smaller by the same amount that the width of each pole face $fb2$ is larger than the uniform width of the remaining pole faces. In the present example, the width of each of the pole faces $fb1$ is equal to one-half, and the width of each of the pole faces $fb2$ is equal to one and one-half, the uniform width of the remaining pole faces. With this arrangement of the pole faces, all successive pole faces again confront successive field poles, respectively, in any rotor position as is desirable for high starting as well as running torque.

For enhanced self-start of the rotor at high torque adequate for even exceptionally high loads, the overall unbalanced pole face area afforded by the two dissimilar pairs of pole faces $fb1$ and $fb2$ is augmented without the addition of any more dissimilar pair or pairs of pole faces. To this end, there are interposed between the dissimilar pairs of pole faces $fb1$ and $fb2$ the diametrically opposite pole faces of uniform widths of at least one pair, and presently of two pairs, so that the latter together with the dissimilar pairs of pole faces $fb1$ and $fb2$ are disaligned from, and hence unbalanced relative to, their respective confronting field poles in the rotor position of optimum alignment of its pole faces with the field poles (FIG. 8). The pitch $pb1$ between each of the pole faces $fb1$ of smallest width and the next adjacent pole faces of uniform widths is thus smaller than the field pole pitch $pb$ and is presently equal to 15°, while the pitch $pb2$ between each of the pole faces $fb2$ of greatest width and the next adjacent pole faces of uniform widths is larger than the field pole pitch $pb$ and is presently equal to 25°.

Figure 9:
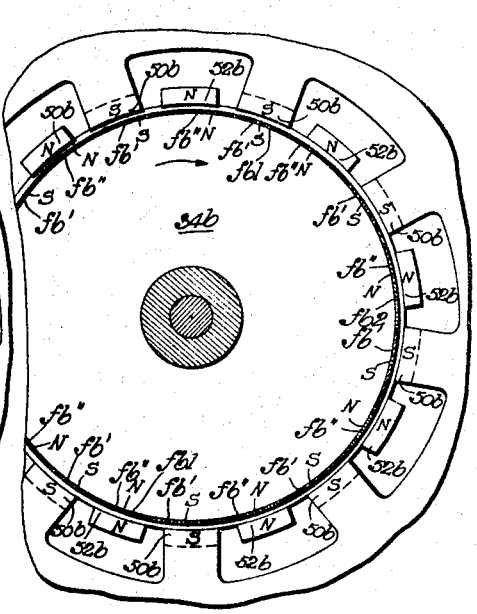
FIG. 9 shows the modified rotor of FIG. 8 in a different position in the field.

That the present rotor 34b is an excellent self-starter, both in vigor and torque, will be seen from FIGS. 8 and 9. Thus, with the rotor in the exemplary repose position in FIG. 8, and with the polarities of the pole faces and the initial polarities of the field poles on excitation of the field being as indicated, it is clearly evident that the rotor will have an initial clockwise torque of quite high magnitude, and the rotor will after a few polarity changes of the field poles take off in either direction with adequate torque to take along its load. Even if the rotor should come to rest in the position shown in FIG. 9, which is substantially coincident with a momentary rotor running position of minimum reluctance and, hence, the worst possible position for a self-start, cooperation between a predominant number of the pole faces and field poles will, on initial polarization of the field poles as indicated, set up a relatively high clockwise torque in the rotor which is but inappreciably opposed by a counter torque in opposite direction produced in the rotor through cooperation of a much smaller number of the pole faces with field poles, so that the resulting initial clockwise torque in the rotor is quite high and the rotor will take off in either direction on the next few polarity changes of the field poles.

The present rotor 34b has also very high running torque despite its large overall unbalanced pole face area and, hence, starting torque, as appears clearly from FIG. 9 in which the rotor is just passing through a momentary running position of minimum reluctance, with the polarities of the field poles just having changed to those indicated. Thus, assuming that the rotor 34b is driven in clockwise direction in FIG. 9 it appears that a predominant number of its pole faces are in momentary positions of near optimum repulsion from and attraction to their nearest field poles in clockwise direction, with a minority number of the pole faces being then in, or so near, effective alignment with their confronting field poles that they will on very slight further clockwise drive of the rotor cooperate with their confronting field poles in augmenting the clockwise rotor torque. Thus, while a majority of the pole faces act to impart to the rotor a torque of already high magnitude in any of its momentary running positions of minimum reluctance, a minority of the pole faces, i.e., the dissimilar pole faces $fb1$, $fb2$ and the pole faces of normal widths interposed between them, act to impart to the rotor a booster torque in the drive direction on its drive slightly beyond its momentary running position of minimum reluctance. In consequence, the running torque of the rotor is exceptionally high, wherefore the present rotor is among the more preferred ones.

While the several rotors described so far rely for a self-start on an overall pitch relation of their pole faces which is different from that of their associated field poles, another type of rotor may have pole faces of the same pitch relation as their associated field poles, yet at least part of them will be differently spaced from the pitch lines of the field poles next to their respective confronting field poles in any rotor position of optimum alignment of its pole faces with the field poles. A characteristic rotor of this other type is shown in FIGS. 10 to 12 and designated by the reference numeral 34c. This rotor, also of permanent-magnet type, has a cylindrical periphery 72 bounded by opposite endfaces 74 and 76. The pole faces are again provided on the periphery 72 and presently are equal in number to the field poles 50c and 52c of the associated sets, with successive pole faces $fc'$ and $fc''$ being of opposite polarities and substantially continuous with each other throughout the rotor periphery. The pole faces $fc'$ and $fc''$ are of identical widths at the rotor endface 74 (FIG. 10), and the adjacent end of successive pole faces alternately extend along lines parallel and identically inclined to the rotor axis $xc$ as indicated at 78 and 80. Accordingly, the pole faces $fc'$ are of identical mean peripheral widths, and the other pole faces $fc''$ are also of identical mean peripheral widths but smaller than those of the pole faces $fc'$ (see also FIG. 11). The pole faces $fc'$ and $fc''$ are thus unbalanced with each other, but their pitch is uniform and equal to the field pole pitch $pc$.

Assuming that the rotor 34c is in the repose position shown in FIG. 11 and that its pole faces are of the polarities indicated, the initial torque produced in the rotor, with the indicated exemplary initial field pole polarities on excitation of the field, is clockwise and is of high magnitude due to the considerable unidirectional unbalance of all pole faces with respect to their confronting field poles, with the rotor taking off in either direction after the next few polarity changes in the rotor. The rotor will self-start from any other repose position, including that shown in FIG. 12 which is substantially coincident with one of its momentary running positions of minimum reluctance. Thus, while the sectioned peripheral margin of the rotor 34c in FIG. 12 shows the pole faces $fc'$ and $fc''$ aligned at their respective means peripheral widths with the field poles, these pole faces are in reality unbalanced with respect to their confronting field poles at their alternate inclined adjacent ends 80 (FIG. 10). In this connection, it will be understood that the clockwise leading ends of the pole faces $fc'$ (FIG. 12) nearer to the rotor endface 76 (FIG. 10) extend into overlap with the clockwise nearest field poles 50c (FIG. 12), while the clockwise trailing ends of the pole faces $fc''$ (FIG. 12) nearer to the opposite rotor endface 74 (FIG. 10) will extend toward, but hardly overlap, the counterclockwise nearest field poles 52c. Accordingly, the pole faces $fc'$ and $fc''$ are, in the rotor positions of optimum pole face alignment with the field poles (FIG. 12), sufficiently unbalanced with respect to the latter for a reliable self-start of the rotor on excitation of the field. By the same token, at least part of the pole faces, and presently all pole faces, are differently spaced from the pitchlines of the field poles nearest to their respective confronting field poles in the rotor positions of optimum alignment of its pole faces within the field poles.

The pole face arrangement of the present rotor 34c is also quite favorable for high running torque. This follows clearly from the exemplary momentary running position of minimum, or near minimum, reluctance of the rotor in FIG. 12 in which all pole faces are with their mean peripheral widths in alignment with their confronting field poles for maximum possible running torque of the rotor if these peripheral pole face widths were uniform throughout the rotor thickness. The actual running torque of the rotor is less, but only inappreciably so, than this maximum possible running torque, owing to the abovementioned actual unbalance of the pole faces with respect to the field poles in the rotor position of FIG. 12.

The rotor 34d of FIG. 13 is of the same type as the rotor 34c of FIG. 10, i.e., the present rotor 34d has pole faces which presently are equal in number to the associated field poles and are substantially continuous with each other throughout the rotor periphery, with successive pole faces $fd'$ and $fd''$ being of opposite polarities and having the same pitch as the field poles. However, the pole faces of the present rotor differ from the pole faces of the rotor 34c of FIG. 10 by being of identical areas and being nevertheless unbalanced with respect to their confronting field poles in the rotor positions of optimum alignment of its pole faces with the field poles. This is achieved by arranging the pole faces $fd'$ and $fd''$ in peripherally unidirectionally offset portions or branches 82 and 84.

Reference is now had to FIG. 14 which shows a rotor 34e that introduces a new aspect of the present invention. Thus, the present rotor 34e has pole faces which extend not only over the rotor periphery 90 but also over a peripheral margin 92 on an endface 94 of the rotor. As appears from FIGS. 14 and 15, the pole faces are again equal in number to the associated field poles 50e and 52e and are also continuous with each other peripherally throughout the rotor, with successive pole faces $fe'$ and $fe''$ being of opposite polarities. The pole faces $fe'$ and $fe''$ are identical in shape and area and their pitch is equal to the field pole pitch. For the unbalance of the identical pole faces $fe'$ and $fe''$ requisite for a self-start of the present rotor, the latter uses in the present instance the pole face unbalancing expediency of the rotor 34d of FIG. 13. To this end, the portions of the pole faces $fe'$ and $fe''$ on the periphery of the present rotor 34e are identical rectangles which are peripherally unidirectionally offset from their augmenting marginal portions on the rotor end-face 94 (FIG. 14).

For effective cooperation of the pole faces fe' and fe" of the present rotor with the field poles 50e and 52e, and indeed for a self-start of the rotor in the first place, the outer field poles 52e on the inner field plate 90 extend radially inwardly as at 92' from their axially extending legs or branches 94' (see also FIG. 15A), with the radially extending field pole branches 92' cooperating with the marginal pole face portions on the rotor endface 94.

FIG. 15 shows the rotor 34e near one of its momentary running positions of minimum reluctance in which the larger peripheral portions of the pole faces are in near alignment with their respective confronting axial field poles. If the rotor should come to rest in this position which is just about the worst one for a self-start, the rotor will nevertheless self-start even from this position. Thus, with the polarities of the pole faces and the initial polarities of the field poles on excitation of the field being as indicated in FIG. 15, the initial torque in the rotor will be counterclockwise owing to the cooperation between the radial field pole branches 92' of presently N polarity and all marginal pole face portions on the rotor endface 94. It follows from FIG. 15 that this initial torque in the rotor is even quite high since the same is subjected to unidirectional drive-inducing repulsive and attractive forces at each radial field pole branch 92', and the rotor will take off in either direction on the next few polarity changes of the field poles. The running torque of the present rotor is also quite high owing to the fact that the pole faces fe' and fe" are balanced in the first place, with the actual running torque being less than a possible maximum, but only inappreciably so, due to the unbalance between the peripheral and marginal portions of the pole faces.

In the final analysis, more surface area of the present rotor is put to use as effective pole face area by extending the peripheral pole faces into an endface of the rotor, thereby achieving not only more economical use of the permanent-magnet material of the rotor but also increased torque of the rotor for its size.

FIG. 14A shows a rotor 34f which may in all respects be like the rotor 34e of FIG. 14, except that in the present rotor 34f at least part of the marginal pole face portions on the rotor endface 98 are of different lengths for unbalance of the pole faces requisite for rotor self-starting purposes.

Reference is now had to FIGS. 16 and 17 which show a rotor 34g that introduces still another aspect of the present invention, namely the use to good advantage of axial flux in a permanent-magnet rotor in addition to radial flux thereof. To this end, the present rotor 34g is a two-piece unit made up of a permanent-magnet disc 100 and an end plate 102 of non-permanent magnetic material. The disc 100 has on its periphery radially magnetized pole faces, presently of identical rectangular shapes and equal in number to the associated field poles 50g and 52g, with successive pole faces fg' and fg" being of opposite polarities and substantially continuous with each other throughout the disc periphery.

The disc 100 is within a circumferential margin thereof also axially magnetized to produce permanent opposite polarities on its opposite endfaces as indicated. The axial flux in the disc 100 is passed through the end plate 102 to shaped peripheral pole faces fg''' of the latter which have the same polarity, presently S, as the adjacent endface 104 of the disc 100. The pole faces fg''' of the end plate 102, which are presently of the same peripheral widths as the pole faces fg' and fg" of the disc 100, are equi-angularly spaced and equal in number to the disc pole faces fg' of the same S polarity. For unbalance of the pole faces for rotor self-starting purposes, the endplate 102 is to this end simply turned with its shaped pole faces fg''' out of alignment with the disc pole faces fg' of the same polarities and the disc 100 and end plate 102 locked together, as by pressfitting them onto a blank shank 106 of the rotor pinion 108, for example. The shaped plate poles fg''' are preferably flush with the disc periphery, though they are for the sake of clarity shown slightly spaced inwardly from the disc periphery in FIG. 17.

The self-starting performance of the present rotor on excitation of the field is self-evident from FIG. 17 in which the rotor is shown in a position that is among the least favorable for a self-start owing to the fact that this rotor position is coincident with a momentary rotor running position of near minimum reluctance. Thus, with the disc pole faces fg' and fg" presently aligned with the field poles, and with the polarities of the rotor pole faces and the initial field pole polarities on excitation of the field being as indicated, the initial torque in the rotor will be counterclockwise as will be readily understood, and the rotor will take off in either direction on the next few polarity changes of the field poles. It is also apparent by now that the starting and running torques of the rotor are quite high.

The instant rotor 34g, by axial as well as radial magnetization of the permanent-magnet disc 100 and the provision of the end plate 102, puts to advantageous use nearly a maximum of the disc material with ensuing near optimum torque in the rotor with the least amount of permanent-magnet material.

FIG. 18 shows a rotor 34h which may in all respects be like the rotor 34g of FIG. 16, except that the present rotor 34h has an additional end plate 110 of non-permanent magnetic material the shaped poles fh''' of which have the same N polarity as the adjacent endface 112 of the permanent-magnet disc 100h and are presently aligned with the pole faces fh" of N polarity. The present rotor 34h thus makes optimum use of the permanent-magnet material of the disc 100h, and the starting and running torques of the rotor are at maximum for the size of the disc 100h.

The rotor 34i of FIG. 19 may in all respects be like the rotor 34e of FIG. 14, except that the present rotor 34i has its pole faces fi' and fi" extending not only over the rotor periphery 114 and over a peripheral margin of its endface 116, but also over a peripheral margin of its opposite endface 118, with the portions of the pole faces on the latter being presently aligned with the pole face portions of corresponding polarity on the rotor periphery. The rotor 34i may simultaneously be magnetized to provide the pole faces fi' and fi" with their extensions into both endfaces of the rotor. However, the pole face extensions into one of the endfaces of the rotor, presently the endface 118 thereof, have no effect on the rotor torque if the rotor is placed into a conventional field pole arrangement such as that in FIG. 20, for instance. The rotor 34i will, of course, self-start and run in the field pole arrangement of FIG. 20 for the same reasons that the rotor 34e will self-start and run in the identical field pole arrangement of FIG. 15.

The present rotor 34i has significant advantages, however, if placed in a field with a new field pole arrangement in which the field poles confront the pole face portions on the periphery as well as the peripheral pole face margins on the opposite endfaces of the rotor. An exemplary field pole arrangement 32i of this type is shown in FIGS. 21 to 23. Thus, the outer field poles 52i extend from an inner field plate 46i in radial lengths 120 and continuing axial lengths 122 to confront the peripheral pole face margins on the endface 116 and the pole face portions on the periphery 114 of the rotor (see also FIG. 22), while the inner field poles 50i extend from an outer field plate 44i in axial lengths 124 and continuing radial lengths 126 which also confront the pole face portions on the periphery 114 and the peripheral pole face margins on the endface 116 of the rotor (see also FIG. 23). The remaining field pole lengths confronting the peripheral pole face margins on the opposite endface 118 of the rotor are provided by an auxiliary field plate 128 in the form of inward pole formations 130 and 132 thereon of which the pole formations 13 form parts or lengths of the inner field poles 50i and the pole formations 132 form parts or lengths of the outer field poles 52i. For flux conductivity between the field poles 50i and 52i and the respective field pole formations 130 and 132 of the auxiliary field plate 128, the latter is secured, presently releasably, to the field poles formed directly by the outer and inner field plates 44i and 46i. To this end, the auxiliary field plate 128 has bent prongs 134 snugly received in slots 136 in the outer field plate 44i, while end stubs 138 on the axial lengths 122 of the field poles 52i are snugly received in slots 140 in the pole formations 132 of the auxiliary field plate 128. To restrict the pole formations 130 and 132 to the momentary polarities of their respective field poles 50i and 52i, successive pole formations 130 and 132 are spaced from each other by bridges 142 of cross-sectional dimensions to become saturated on each flux surge in the field.

With the rotor 34i of FIG. 19 placed in the field pole arrangement 32i of FIGS. 21 to 23, the pole face portions on the periphery and all the peripheral pole face margins on both endfaces of the rotor will most effectively cooperate with the field poles for optimum torque of the rotor for its size, as will be readily understood.

FIG. 24 shows a rotor 34k which may in all respects be like the rotor 34i of FIG. 19, except that the present rotor 34k does not have any portions of its pole faces unbalanced for self-starting purposes. Thus, the portions of the identical pole faces fk' and fk" on the periphery and on the peripheral margins of both endfaces of the rotor are in alignment with each other, wherefore the rotor may or may not self-start just like other rotors having no unbalance in their pole face arrangement, or an expediency other than rotor design may be relied on automatically to start the rotor on excitation of the associated field. However, the present rotor 34k does have obvious and significant advantages when placed in a field pole arrangement like or similar to that shown in FIGS. 21 to 23.

Reference is now had to FIG. 25 which shows a motor 150 with a self-starting rotor unit that is an offspring of the self-starting rotor 34d of FIG. 13 and differs from the latter primarily by being divided into two separate rotors 34m with peripheral pole faces fm which presently are identical in shape and size. The rotors 34m, which are mounted on a rotary shaft 152, are with their respective pole faces fm angularly displaced from each other sufficiently for self-starting in the balanced field of the motor.

The present motor 150 features a dual field, one for each rotor, and a single coil 154. To this end, two opposite sets of axially extending inner poles 156' and 156" are provided on a single field plate 158. Arranged circularly with the inner poles 156' of one set and alternating with successive ones thereof are outer poles 160 of a set which are provided on a field cup 162. Arranged circularly with the inner poles 156" of the other set and alternating with successive ones thereof are outer poles 164 of another set which are provided on another field cup 166. The field cups 162 and 164, which provide a receptacle for the single coil 154, are with their respective poles 160 and 164 suitably attached to a non-magnetic sleeve 168 for their securement to each other with their poles arranged circularly about the rotor axis xm. Similarly, the field plate 158 is with its poles 156' and 156" suitably secured to the same sleeve 168.

The poles of the two fields are in the present instance balanced, i.e., the inner and outer poles of each field are equi-angularly spaced from each other. The poles of both fields are also axially aligned with each other. Thus, the outer poles 160 of the one field are axially aligned with the inner poles 156" of the other field, while the inner poles 156' of the one field are axially aligned with the outer poles 164 of the other field. Hence, with the rotors 34m being with their pole faces fm angularly displaced from each other as mentioned above, these rotors will self-start on energization of the coil 154. Of course, the self-starting dual rotors may, if desired, be placed in a single field with a single set of inner and outer field poles.

While in the exemplary rotor 150 of FIG. 25 the pole sets of both fields are "balanced" and the rotors 34m "unbalanced" for their self-start, FIG. 26 shows a motor 170 in which the rotors 34n are "balanced," but the pole sets of the two fields are "unbalanced" for a self-start of the rotors 34n. Thus, the peripheral pole faces fn of the rotors 34n are of identical shapes and sizes, and the pole faces of like polarity of both rotors are axially aligned with each other as shown. On the other hand, the poles of one field are angularly displaced from the poles of the other field for a self-start of the rotors 34n on energization of the coil 172.

The present motor 170 also features a dual field which is different from that of the motor 150 of FIG. 25. The two fields are presently formed by two single field cups 174 and 176, with the field poles thereof being formed according to a method shown and described in my copending application Serial No. 24,827, filed April 26, 1960. Since both field cups 174 and 176 with their pole sets are presently identical, a description of the formation of only one of them, i.e., the cup 176, in accordance with this method will be necessary. Briefly, and with reference to FIGS. 26 and 27, the field cup 176 is initially blanked from flat plate stock, and the inner field plate part 178 with the then coplanar outer poles 180 is in a die operation blanked from the outer field plate part 182 of the initial blank and drawn into the general cup-shape (FIG. 26) in which the outer poles 180 extend parallel to the rotor axis xn. Several, presently three, equi-angularly spaced outer poles 180 have extensions 184 which in the same die operation are formed outwardly into parallelism with the bottom part of the cup-shaped field plate 178. The inner field plate 178 thus formed is in the same die temporarily held out of the aperture 186 left in the outer field plate 182 on blanking the inner field plate 178 therefrom. Thus, it appears from FIG. 27 that the blanking of the outer poles 180 of the inner plate 178 left the wider recesses 188 and narrower recesses 190 in the outer plate 182, and the blanking of the inner poles 192 of the outer plate 182 left the recesses 194 in the inner plate 178. The inner poles 192 of the outer plate 182 are drawn into extension parallel to the rotor axis xn in the same die and at the same time the outer poles 180 of the inner plate 178 are drawn into extension parallel to the rotor axis. The formed inner plate 178 is then in the same die moved relative to the formed outer plate 182 for re-entry in jamming fashion of its pole extensions 184 into the narrower recesses 190 in the outer plate 182, as at 196, for permanent joinder of the inner and outer plates to all intents and purposes into an integral structure. The pole extensions 184 form with the walls of the recesses 190 in which they are jammed saturation-type bridges between the plates to compel magnetic flux to flow in the usual circuitous path in the field. The formation of the outer field plate 182 into the remaining cup shape at 198 may be undertaken at any convenient stage of its overall formation.

The field cups 174 and 176 thus formed are placed back-to-back (FIG. 26) and attached to each other, presently through intermediation of a bearing 200 for the rotor shaft 202 on which both rotors 34n are mounted. As already mentioned, the pole sets of both fields in the present exemplary motor are "unbalanced," and to this end one of the field cups 174, 176 is angularly displaced about the rotor axis xn relative to the other field cup sufficiently to disalign the poles of one field axially from the poles of the other field the requisite amount.

Reference is now had to FIGS. 28 to 30 which show another self-starting dual-type rotor unit 210 in a conventional field having inner and outer plates 212 and 214 with coordinated outer and inner field poles 216 and 218 about the rotor axis *xp*. The rotors 34*p* on the rotary shaft 220 are in the present instance identical, i.e., their pole faces *fp* are alike in shape and size. One of these rotors, presently the rotor 34*p'*, is fixed on the shaft 220, while the other rotor 34*p''* is turnable on the same shaft. The rotors have free relative motion through a given angular range. To this end, there is mounted on the shaft 220 a collar 222 with presently two depending pins 224 which project into diametrically opposite peripheral recesses 226 in a member 228 on the rotor 34*p''*. The member 228 is in the present instance a ring which is pressed onto a sleeve 230 of the rotor 34*p''*. The collar 222 on the rotor shaft 220, and hence also the fixed rotor 34*p'* thereon, are resiliently coupled to the loose rotor 34*p''* on the same shaft. To this end, the collar 222 is provided with two diametrically opposite spring fingers 232 which project into V-shaped notches 234 in the confronting face of the ring member 228. The pins 224 and spring fingers 232 on the collar 222 are so coordinated with the recesses 226 and V-shaped notches 234 in the ring member 228 that the spring coupling 232, 234 normally urges the loose rotor 34*p''* into a position intermediate its free-motion range with the fixed rotor 34*p'* in which the end walls *w* of the recesses 226 in the ring member are spaced from the respective pins 224 on the collar 222 (FIG. 29). Accordingly, the rotors 34*p* will in their repose position be coordinated as shown in FIGS. 28 and 29, from which it appears that the pole faces of the fixed rotor 34*p'* on the shaft 220 lead the nearest pole faces of like polarity of the loose rotor 34*p''* thereon in clockwise direction which in the present example is the normal running direction of the motor. To determine the normal running direction of the motor in the exemplary clockwise direction (FIG. 29), there is provided a one-way device which in the present instance comprises a peripheral shoulder 236 on the collar 222 and a leaf spring 238 which is suitably mounted on the field and extends with its free end to the collar 222. Thus, if the rotor unit 210 should self-start in the wrong direction, i.e., counterclockwise as viewed in FIG. 29, the shoulder 236 will run against the end of the fixed spring 238 in its path and cause the rotor unit to reverse into its normal clockwise drive direction. However, on a self-start of the rotor unit in the correct, clockwise, direction, the leaf spring 238 will simply override the shoulder 236 everytime the same passes. While the one-way device just described is applied in the present instance at the rotor shaft 220 for simplicity of illustration, the same is generally applied at a convenient stage of a reduction gearing (not shown) which is driven from the rotor shaft and usually combined with the motor in a self-contained unit.

Assuming now that the rotor unit 210 is in the exemplary repose position shown in FIGS. 28 and 29 and that current is applied to the field coil 240, either rotor 34*p*, and usually both rotors, will respond to the constantly alternating, instantaneous opposite polarities of the inner and outer field poles 216 and 218 in excited fashion until either or both self-start in either direction. Until the rotor unit 210 thus self-starts, the loose rotor 34*p''* on the shaft 220 has relative freedom to respond to magnetic forces acting thereon and move within and to either end of its permissible range of free motion relative to the other rotor 34*p'* as determined by the permissible relative motion between the pins 224 on the collar 222 and the recesses 226 in the ring member 228. Of course, the leaf springs 232 oppose such relative rotation between the rotors but are ineffectual to prevent it, the force of the springs being only such as to shift the loose rotor 34*p''* into its unbalanced condition with respect to the other rotor 34*p'* (FIGS. 28 and 29) when the motor is deenergized. Once the rotor unit 210 self-starts, either rotor will be pulled into substantial phase with that one which first steps in phase with the alternating field, and the same nearest adjacent pole faces of like polarity of both rotors will always become substantially axially aligned (FIG. 30). Thus, it appears from FIG. 29 that with the exemplary range of free relative motion between the rotors 34*p* and the exemplary overlap of the nearest pole faces of like polarity of both rotors, the only possible way in which the loose rotor 34*p''*, for example, may pull into phase with the other rotor 34*p'*, is for the former to step with its pole face *fp'*, for instance, into substantial axial alignment with the pole face *fp'* of the latter (see also FIG. 30).

It follows from the preceding that the rotors 34*p* are unbalanced with respect to each other when in repose position (FIG. 29), thus making for a lively self-start of either rotor, and more often than not of the loose rotor 34*p''*, to set the rotor unit 210 in motion, either in the correct drive direction or in the wrong drive direction, with the described one-way device going into action and reversing the rotor unit in case the same starts in the wrong direction. Once the rotor unit has self-started, the rotor last to step into phase with the alternating field will by magnetic forces be drawn into substantial phase with the other rotor in which their pole faces of like polarity are in substantial axial alignment with each other as, for example, the pole faces *fp'* (FIGS. 29 and 30).

Assuming now that the rotor unit 210 is running in the correct clockwise drive direction (FIG. 30) with both rotors being in substantial phase with each other, the loose rotor 34*p''* will add its developed torque to the rotor shaft 220, owing to the fact that the end walls *w'* of the peripheral recesses 226 bear and exert a clockwise force against the respective pins 224 on the shaft collar 222 (FIG. 30). The output torque of the rotor unit 210 is thus approximately double that of a single rotor 34*p*. More importantly, the present rotor unit 210 is self-starting, yet sacrifices no running torque, or no appreciable running torque, at the cost of its self-starting characteristics as is customary with prior self-starting rotors. Thus, the present rotor unit develops a running torque substantially as high as a non-starting balanced rotor of a size and pole face arrangement of both single rotors of the present unit, yet has the advantage of assured self-starting.

The ring member 228 is preferably of resilient rubberlike material, such as neoprene, for example, thereby assuring that the end walls *w'* of the recesses 226 therein uniformly engage and transmit the torque of the loose rotor 34*p''* to the rotor shaft 220.

The provision of the loose rotor 34*p''* is further advantageous in that the load on the motor does not impede the self-start of this rotor, because the load, if backing-up on deenergization of the motor, will back against the described one-way device and, hence, impede self-start of the other rotor only. With the loose rotor 34*p''* thus free to self-start without impediment from the load, the same will freely move and on impact with the fixed rotor on the shaft jar the same into motion so as assuredly to overcome the opposing load.

The range of the free motion between the rotors 34*p* as determined by the pins 224 and recesses 226, and the coordination of this free-motion range with the pole faces of both rotors, are such that the associated pole faces of like polarity of both rotors are substantially aligned at one end of the free-motion range (FIG. 30), and are at the other end of the free-motion range out of phase with each other, but no more than will assure their return into substantial phase with each other on each normal run of the motor. Thus, the range of free relative motion between the rotors may be selected anywhere from above 0° to somewhat less than 180° (electrical) between successive pole faces of like polarity of either rotor.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a self-starting synchronous motor, the combination with a field having two sets of field poles arranged circularly about an axis of which successive poles of one set alternate with successive poles of the other set, and an associated field coil adapted on energization to produce opposite instantaneous polarities in said pole sets, of a permanent-magnet rotor turnable about said axis and having two series of pole faces of opposite polarities, respectively, said rotor including a periphery provided with successive areas of opposite polarities of said pole faces substantially continuous with each other and confronting successive field poles, respectively, in any rotor position, and said pole faces being arranged so that at least part thereof are spaced differently from the pitchlines of the field poles next to their respective confronting field poles in the rotor positions of optimum alignment of the pole faces with the field poles for a self-start of the rotor from any repose position substantially coincident with any of its running positions of minimum reluctance.

2. In a self-starting synchronous motor, the combination with a field having two sets of field poles arranged circularly about an axis of which successive poles of one set alternate with successive poles of the other set, and an associated field coil adapted on energization to produce opposite instantaneous polarities in said pole sets, of a permanent-magnet rotor turnable about said axis and having two series of pole faces of opposite polarities, respectively, said rotor including a cylindrical periphery provided with successive areas of opposite polarities of said pole faces equal in number to the field poles and confronting successive field poles, respectively, in any rotor position, with said areas being substantially continuous with each other throughout the rotor periphery, and said pole faces being arranged so that at least part thereof are differently spaced from the pitchlines of the field poles next to their respective confronting field poles in the rotor positions of optimum alignment of the pole faces with the field poles for a self-start of the rotor from any repose position substantially coincident with any of its running positions of minimum reluctance.

3. In a self-starting synchronous motor, the combination with a field having two sets of field poles arranged circularly about an axis of which successive poles of one set alternate with successive poles of the other set, and an associated field coil adapted on energization to produce opposite instantaneous polarities in said pole sets, of a permanent-magnet rotor turnable about said axis and having a cylindrical periphery and pole faces formed by successive areas of opposite polarities of the rotor periphery substantially continuous with each other and confronting successive field poles, respectively, in any rotor position, and said pole face areas being arranged so that at least part thereof are differently spaced from the pitchlines of the field poles next to their respective confronting field poles in the rotor positions of optimum alignment of the pole face areas with the field poles for a self-start of the rotor from any repose position substantially coincident with any of its running positions of minimum reluctance.

4. The combination in a self-starting synchronous motor as set forth in claim 3, in which said pole face areas are equal in number to the field poles and substantially continuous with each other throughout the rotor periphery.

5. In a self-starting synchronous motor, the combination with a field having two sets of field poles arranged circularly about an axis of which successive poles of one set alternate with successive poles of the other set and all poles are spaced at substantially uniform pitch, and an associated field coil adapted on energization to produce opposite instantaneous polarities in said pole sets, of a permanent-magnet rotor turnable about said axis and having a cylindrical periphery and pole faces formed by successive areas of the rotor periphery equal in number to the field poles and confronting successive field poles, respectively, in any rotor position, with successive ones of said pole face areas being of opposite polarities and substantially continuous with each other throughout the rotor periphery, and the overall pitch relation between said pole face areas being different from that between the field poles for a self-start of the rotor from any repose position substantially coincident with any of its running positions of minimum reluctance.

6. In a self-starting synchronous motor, the combination with a field having two sets of field poles arranged circularly about an axis of which successive poles of one set alternate with successive poles of the other set and all poles are spaced at substantially uniform pitch, and an associated field coil adapted on energization to produce opposite instantaneous polarities in said pole sets, of a permanent-magnet rotor turnable about said axis and having a cylindrical periphery and pole faces formed by successive areas of the rotor periphery equal in number to the field poles and confronting successive field poles, respectively, in any rotor position, with successive ones of said pole face areas being of opposite polarities and substantially continuous with each other throughout the rotor periphery, and said pole face areas being arranged in two groups of which those of either group may align with their respective confronting field poles while those of the other group are out of alignment with their respective confronting field poles for a self-start of the rotor from any position on energization of said coil.

7. The combination in a self-starting synchronous motor as set forth in claim 6, in which a majority of said pole face areas are of identical peripheral widths and spaced apart at the field pole pitch, and the remaining pole face areas are of different widths than said majority thereof and are so arranged in order among all pole face areas that at least a predominant number of said majority of pole face areas may simultaneously align with field poles.

8. The combination in a self-starting synchronous motor as set forth in claim 6, in which all but two pairs of said pole face areas are of identical peripheral widths and spaced apart at the field pole pitch, the pole face areas of each of said pairs are diametrically opposite each other and the widths of each pole face area of one pair and of the other pair are by the same amounts larger and smaller, respectively, than the width of the other pole face areas, and said pairs of pole face areas are so arranged in order among all pole face areas that at least a predominant number of said other pole face areas may simultaneously align with field poles.

9. The combination in a self-starting synchronous motor as set forth in claim 6, in which all but two pairs of said pole face areas are of identical peripheral widths and spaced apart at the field pole pitch, the pole face areas of each of said pairs are diametrically opposite each other and the widths of each pole face area of one pair and of the other pair are equal to one-half and one and one-half the width of the other pole face areas, respectively, and said other pole face areas are so arranged in order among all pole face areas that at least a predominant number of said other pole face areas may simultaneously align with field poles.

10. The combination in a self-starting synchronous motor as set forth in claim 6, in which all but two first pairs of said pole face areas are of identical peripheral widths and spaced apart at the field pole pitch, the pole face areas of each of said pairs are diametrically opposite each other and the widths of each pole face area of one pair and of the other pair are by the same amounts larger and smaller, respectively, than the width of the other pole face areas, and diametrically opposite ones of at least one pair of said other pole face areas are interposed between and substantially continuous with the nearest pole face areas of said first pairs so that all pole face areas other than said pairs may simultaneously align with field poles.

11. In a self-starting synchronous motor, the combination with a field having two sets of field poles arranged circularly about an axis of which successive poles of one set alternate with successive poles of the other set and all poles are spaced at substantially uniform pitch, and an associated field coil adapted on energization to produce opposite instantaneous polarities in said pole sets, of a permanent-magnet rotor turnable about said axis and having a cylindrical periphery and pole faces formed by successive areas of the rotor periphery equal in number to the field poles and substantially continuous with each other throughout the rotor periphery, with successive ones of said pole face areas being of opposite polarities and confronting successive field poles, respectively, in any rotor position, the pitch between said pole face areas being the same as the field pole pitch and the adjacent ends of at least part of the successive pole face areas extending along lines other than parallel to said axis for a self-start of the rotor on energization of said coil.

12. The combination in a self-starting synchronous motor as set forth in claim 11, in which all pole face areas are identical and each is formed of two rectangular portions of identical peripheral widths and offset from each other peripherally of the rotor.

13. The combination in a self-starting synchronous motor as set forth in claim 11, in which said rotor has opposite endfaces between which said periphery extends, said pole face areas are of the same peripheral widths at one of said endfaces, and successive ends of the successive pole face areas extend along lines alternately parallel and inclined to said axis.

14. In a self-starting synchronous motor, the combination with a field having two sets of field poles arranged circularly about an axis of which successive poles of either set alternate with successive poles of the other set, with all poles being spaced at substantially uniform pitch and the poles of one of said sets having successive lengths extending parallel to and radially of said axis, respectively, and an associated field coil adapted on energization to produce opposite instantaneous polarities in said pole sets, of a permanent-magnet rotor turnable about said axis and having opposite endfaces and a cylindrical periphery, as well as successive pole faces equal in number to the field poles and confronting successive field poles, respectively, in any rotor position, each of said pole faces being formed by an area of adjacent portions of the rotor periphery and a circumferential margin of the one rotor endface next to said radial field pole lengths, with successive pole face areas having opposite polarities and being substantially continuous with each other at least throughout the rotor periphery, and said pole face areas being arranged so that at least part thereof are differently spaced from the pitchlines of the field poles next to their respective confronting field poles in the rotor positions of optimum alignment of the pole face areas with the field poles for a self-start of the rotor from any position on energization of said coil.

15. The combination in a self-starting synchronous motor as set forth in claim 14, in which said pole face areas are identical and spaced at the field pole pitch, with said portions of the pole face areas on said one rotor endface being angularly offset unidirectionally from the respective portions thereof on the rotor periphery.

16. In a self-starting synchronous motor, the combination with a field having two sets of field poles arranged circularly about an axis of which successive poles of one set alternate with successive poles of the other set and all poles are spaced at substantially uniform pitch, and an associated field coil adapted on energization to produce opposite instantaneous polarities in said pole sets, of a rotor turnable about said axis and having a permanent-magnet disc with a cylindrical periphery and opposite endfaces of opposite polarities, and a non-permanent magnetic plate on and having the polarity of one of said endfaces, said disc having on its periphery successive first pole faces of opposite polarities substantially continuous with each other and confronting successive field poles, respectively, in any rotor position and said plate having other shaped pole faces adjacent said rotor periphery and confronting field poles, respectively, in any rotor position, and all pole faces being arranged so that part thereof may align with their respective confronting field poles while the remaining ones are out of alignment with their respective confronting field poles for a self-start of the rotor from any position on energization of said coil.

17. The combination in a self-starting synchronous motor as set forth in claim 16, in which said first pole faces are equal in number to the field poles and spaced at the field pole pitch, and said other pole faces are equal to one-half the number of field poles and spaced at twice the field pole pitch and angularly displaced from said first pole faces.

18. In a self-starting synchronous motor, the combination of a field having two sets of field poles arranged circularly about an axis of which successive poles of one set alternate with successive poles of the other set and the poles of each set have successive lengths parallel to and radially of said axis, respectively, with said radial lengths of the poles of said sets projecting from their respective parallel lengths toward said axis and lying in spaced planes, respectively, substantially normal to said axis; an associated field coil adapted on energization to produce opposite instantaneous polarities in said pole sets; and a permanent-magnet rotor turnable about said axis and having a cylindrical periphery and opposite endfaces adjacent said planes, respectively, as well as successive pole faces of opposite polarities confronting successive field poles, respectively, in any rotor position, each of said pole faces being formed by a first portion of said periphery and adjacent second portions of circumferential margins of said endfaces, and said pole faces being arranged so that at least part thereof are differently spaced from the pitchlines of the field poles next to their respective confronting field poles in the rotor positions of optimum alignment of the pole faces with the field poles for a self-start of the rotor from any position on energization of said coil.

19. The combination in a self-starting synchronous motor as set forth in claim 18, in which the field poles are spaced at substantially uniform pitch, and said pole faces are equal in number to and spaced at the same pitch as the field poles and substantially continuous with each other peripherally throughout the rotor, with a first part and the remaining part of said second portions of said pole faces being radially aligned with and unidirectionally disaligned from their first portions, respectively, for a self-start of the rotor from any position on energization of said coil.

20. A self-starting rotor for a synchronous motor with circularly arranged field poles of substantially uniform pitch, comprising a permanent-magnet disc with a cylindrical periphery and pole faces formed by successive areas of opposite polarities of said periphery equal in number to the field poles and substantially continuous with each other throughout said periphery, with the pitch between at least part of said pole faces being different from that between the remaining pole faces.

21. A self-starting rotor as set forth in claim 20, in which all but two pairs of said pole faces are of identical peripheral widths and spaced apart at the field pole pitch, the pole faces of each of said pairs are diametrically opposite each other and the widths of each pole face of one pair and of the other pair are by the same amounts larger and smaller, respectively, than the width of the other pole faces, and said pole face pairs are so arranged in order among all pole faces that at least a predominant number of said other pole faces are spaced from each other by amounts equal to integer numbers of the field pole pitch.

22. A self-starting rotor for a synchronous motor with circularly arranged field poles, comprising a permanent-magnet disc with a center axis having a cylindrical periphery and pole faces formed by successive areas of opposite polarities of said periphery equal in number to the field poles and substantially continuous with each other throughout said periphery, with the pitch between said pole faces being equal to the field pole pitch and the adjacent ends of at least part of the successive pole faces extending along lines other than straight parallel to said axis.

23. A self-starting rotor as set forth in claim 22, in which all pole faces are identical and each is formed of two rectangular portions of identical peripheral widths and offset from each other peripherally of said disc.

24. A self-starting rotor as set forth in claim 22, in which said disc has opposite endfaces between which said periphery extends, said pole faces are of the same peripheral widths at one of said endfaces and successive ends of the successive pole faces extend along lines alternately parallel and inclined to said axis.

25. A self-starting rotor for a synchronous motor with circularly arranged field poles of substantially uniform pitch, comprising a permanent-magnet disc with opposite endfaces and a cylindrical periphery and having identical pole faces equal in number to the field poles and spaced at the field pole pitch, each of said pole faces being formed by adjacent portions of the rotor periphery and a circumferential margin of one endface with successive pole faces being of opposite polarities and substantially continuous with each other at least throughout said periphery, and said portions of the pole faces on said one endface being angularly offset unidirectionally from the respective peripheral portions thereof.

26. A self-starting rotor for a synchronous motor with circularly arranged field poles of substantially uniform pitch, comprising a permanent-magnet disc with a cylindrical periphery and opposite endfaces of opposite polarities, and a non-permanent magnetic plate on and having the polarity of one of said endfaces of said disc, said disc having on its periphery successive first pole faces of opposite polarities equal in number to the field poles and spaced at the field pole pitch and being substantially continuous with each other throughout said periphery, and said plate having adjacent said disc periphery shaped identical pole faces of one-half the number of the field poles and spaced at twice the field pole pitch and angularly displaced from said first pole faces.

27. A self-starting rotor for a synchronous motor with circularly arranged field poles of substantially uniform pitch, comprising a permanent-magnet disc with a center axis having a cylindrical periphery and opposite endfaces, as well as successive pole faces of opposite polarities equal in number to the field poles, each of said pole faces being formed by a first portion of said periphery and adjacent second portions of circumferential margins of said endfaces, said pole faces being spaced at the field pole pitch and substantially continuous with each other peripherally throughout the rotor, with a first part and the remaining part of said second portions of said pole faces being radially aligned with and unidirectionally disaligned from their respective first portions.

28. In a self-starting synchronous motor, the combination of two fields each having a unit of two sets of field poles of which successive poles of one set alternate with successive poles of the other set, with the poles of the units of both fields arranged circularly about a common axis, and a single field coil associated with both fields and adapted on energization to produce opposite instantaneous polarities in the poles of said units; and two permanent-magnet rotors turnable in unison about said axis in cooperative relation with said pole units, respectively, and each having pole faces cooperating with the poles of the respective unit, said field poles and said pole faces constituting series of poles, respectively, of which part of the poles of one series are disaligned from poles of the other series when the remaining poles of said one series align with poles of said other series for a self-start of said rotors on energization of said coil.

29. The combination in a self-starting synchronous motor as set forth in claim 28, in which the field poles of said units and the pole faces of said rotors are identically equi-angularly spaced, and the pole faces of one rotor are disaligned from the field poles of the associated unit when the pole faces of the other rotor are aligned with the field poles of the other unit.

30. In a self-starting synchronous motor, the combination with a field having two sets of field poles arranged circularly about an axis of which successive poles of one set alternate with successive poles of the other set, and an associated field coil adapted on energization to produce opposite instantaneous polarities in said pole sets, of a rotor unit having a shaft turnable about said axis, two permanent-magnet rotors of which one is fixed and the other turnable on said shaft and both have pole faces arranged for their substantial alignment with said field poles, a lost-motion connection between said rotors through an angular range of less than 180 electrical degrees between successive pole faces of like polarity, at one end of which range the pole faces of like polarity of said rotors are in substantial axial alignment, and a resilient coupling between said rotors normally urging them into a self-starting relative repose position remote from said one end of said range in which the pole faces of both rotors are out of alignment with the field poles, and permitting relative motion of said rotors to either end of said range under magnetic forces from the field, so that said rotors have substantially the same running positions of minimum reluctance in which their pole faces align with the field poles and impart their combined running torque to said shaft in a given drive direction.

31. A dual field for a synchronous reaction motor with twin permanent-magnet rotors, comprising inner pole plate means having two back-to-back sets of outer field poles about a common axis with the poles of said sets extending axially in opposite directions, respectively, outer field plates having sets of inner field poles about said axis and coordinated with said outer pole sets, respectively, of which successive outer poles of either set alternate with successive inner poles of the coordinated set; and a single field coil associated with said field poles to produce on energization opposite instantaneous polarities in the poles of said coordinated sets with the polarities of said outer pole sets being at any instant opposed to each other.

32. In a self-starting synchronous motor, the combination with a field having two sets of field poles arranged circularly about an axis of which successive poles of one set alternate with successive poles of the other set, and an associated field coil adapted on energization to produce opposite instantaneous polarities in said pole sets, of a permanent-magnet rotor turnable about said axis and having two series of pole faces of opposite polarities, respectively, said rotor including a periphery provided with a plurality of successive groups of areas of said pole faces of which successive areas of each group are of opposite polarities and substantially continuous with each other, and said area groups and areas thereof being spaced so that in repose positions of the rotor substantially coincident with its running positions of minimum reluctance there is sufficient overall unbalance between said pole faces and field poles for an assured self-start of the rotor on reenergization of said coil.

33. In a self-starting synchronous motor, the combination with a field having two sets of field poles arranged circularly about an axis of which successive poles of one set alternate with successive poles of the other set, and an associated field coil adapted on energization to produce opposite instantaneous polarities in said pole sets, of a permanent-magnet rotor turnable about said axis and having two series of pole faces of opposite polarities, respectively, said rotor including a periphery provided with a plurality of successive groups of areas of said pole faces of which successive areas of each group are of opposite polarities and substantially continuous with each other, and said area groups and areas thereof being spaced so that the areas of certain ones of said groups may simultaneously align with successive field poles while the areas of the remaining groups are out of alignment with field poles for an assured self-start of the rotor from any repose position substantially coincident with any of its running positions of minimum reluctance on reenergization of said coil.

34. In a self-starting synchronous motor, the combination with a field having two sets of field poles arranged circularly about an axis of which successive poles of one set alternate with successive poles of the other set, and an associated field coil adapted on energization to produce opposite instantaneous polarities in said pole sets, of a permanent-magnet rotor turnable about said axis and having two series of poles faces of opposite polarities, respectively, said rotor including a periphery provided with groups of pole faces of which successive ones of each group are of opposite polarities and substantially continuous with each other, and each group has a plurality of first pole faces spaced substantially at the field pole pitch and a plurality of other pole faces each spaced from each adjacent pole face at the pitch different from the field pole pitch for an assured self-start of the rotor from any repose position substantially coincident with any of its running positions of minimum reluctance on reenergization of said coil.

References Cited in the file of this patent
UNITED STATES PATENTS

| | | |
|---|---|---|
| 2,192,073 | Giskes | Feb. 27, 1940 |
| 2,432,573 | Jorgensen | Dec. 16, 1947 |
| 2,541,830 | Phaneuf | Feb. 13, 1951 |
| 2,548,633 | Stephenson | Apr. 10, 1951 |
| 3,014,141 | Riggs | Dec. 19, 1961 |
| 3,032,670 | Fritz | May 1, 1962 |